US012196235B2

(12) United States Patent
Sanchis et al.

(10) Patent No.: US 12,196,235 B2
(45) Date of Patent: Jan. 14, 2025

(54) FLOW BORE GUIDE VANE INSERT

(71) Applicant: FMC Technologies, Inc., Houston, TX (US)

(72) Inventors: Arnaud Sanchis, Houston, TX (US); Guilherme Moura, Houston, TX (US); Leonardo Bernardo, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 463 days.

(21) Appl. No.: 17/753,867

(22) PCT Filed: Sep. 19, 2019

(86) PCT No.: PCT/US2019/051866
§ 371 (c)(1),
(2) Date: Mar. 16, 2022

(87) PCT Pub. No.: WO2021/054957
PCT Pub. Date: Mar. 25, 2021

(65) Prior Publication Data
US 2022/0349430 A1 Nov. 3, 2022

(51) Int. Cl.
*F15D 1/02* (2006.01)
*E21B 34/02* (2006.01)
(Continued)

(52) U.S. Cl.
CPC ............... *F15D 1/02* (2013.01); *E21B 34/02* (2013.01); *E21B 43/2607* (2020.05); *F16L 57/06* (2013.01)

(58) Field of Classification Search
CPC ............... F15D 1/02; F15D 1/04; E21B 34/02
(Continued)

(56) References Cited

U.S. PATENT DOCUMENTS 1,974,110 A * 9/1934 Higley ............... F15D 1/04
138/39
5,529,084 A * 6/1996 Mutsakis ............. F15D 1/04
137/13
(Continued)

FOREIGN PATENT DOCUMENTS

GB       2473052 A      3/2011
WO   2019170296 A1    9/2019

OTHER PUBLICATIONS

International Search Report issued in International Application No. PCT/US2019/051866 dated May 19, 2020 (4 pages).
(Continued)

*Primary Examiner* — Patrick F Brinson
(74) *Attorney, Agent, or Firm* — Osha Bergman Watanabe & Burton LLP

(57) ABSTRACT

A valve block may have a cross-drill intersection bore formed within the valve block by a first flow bore intersecting a second flow bore. Additionally, at least one insert may be within the first flow bore or the second flow bore. The at least one insert may include a wall contacting an inner surface of the first flow bore or the second flow bore, a passageway defined within the wall and having openings at opposite ends of the insert, and a plurality of vanes extending from an inner surface of the wall into the passageway. The one of the opposite ends of the at least one insert may align with a surface of the cross-drill intersection bore. The at least one insert may reduce and/or protect the bores within the valve block from erosional damage.

8 Claims, 8 Drawing Sheets

(51) Int. Cl.
  *E21B 43/26*   (2006.01)
  *F16L 57/06*   (2006.01)
(58) Field of Classification Search
  USPC .................................................... 138/37, 97
  See application file for complete search history.

(56)                References Cited

U.S. PATENT DOCUMENTS 5,992,465  A      11/1999  Jansen
  8,978,705  B2      3/2015  Marica
  9,228,542  B2 *    1/2016  Anderson ........ F02M 35/10262
  2013/0153074 A1 *  6/2013  Gurr ........................ F15D 1/02
                                                        138/39
  2016/0102797 A1 *  4/2016  Farrow .................... F15D 1/02
                                                         137/1
  2017/0306994 A1   10/2017  Schmidt et al.
  2018/0149177 A1    5/2018  Moger, IV
  2019/0153803 A1    5/2019  Cook

OTHER PUBLICATIONS

Written Opinion issued in International Application No. PCT/US2019/051866 dated May 19, 2020 (6 pages).

* cited by examiner

FLOW BORE GUIDE VANE INSERT

BACKGROUND

Flow manifolds, blocks, and trees may be useful in the process of extracting and managing wells that are drilled into the earth to retrieve one or more subterranean natural resources, including oil and gas. Said flow manifolds may be utilized both offshore and onshore. In operations, flow manifolds are particularly useful in directing and managing the flow of fluids (e.g. oil and/or gas) from one or more wells (subsea or land). A flow manifold is a structure having a plurality of flow bores along with a set of pipes and components through which fluid, such as oil and gas, may flow. Further, flow manifolds may include a number of flow control devices, including valves and chokes, and may also include a number of instruments or devices for measuring and obtaining pertinent data about the fluid flowing through the one or more pipes located in the flow manifolds.

When used in a marine environment, a subsea flow manifold may be landed and locked adjacent to a subsea tree or other subsea structures. As part of field architecture and planning, the location of subsea trees around one or more wells involves the planning for flow manifolds that assist in routing the fluids produced from the wells to another subsea structure or to a riser pipeline for further processing.

Due to the fluid flow through the flow manifold, erosion may occur within the flow manifold and may cause critical damage to the flow manifold. Conventional flow manifolds may have long straight flow bores or pipes to smooth effects from erosion due to flow. However, by having long straight flow bores or pipes, conventional flow manifolds may have an increased footprint and overall size, as well as increase cost to the manufacturing process. Additionally, said conventional flow manifolds may have intersections cross-drilled through the long straight flow bores or pipes which may increase excessive erosion during the operation lifetime of the conventional flow manifolds. Erosion effects within the conventional flow manifolds may be increasingly critical when internals components are positioned close to the cross-drills intersections. Further, depending on a production flow direction, high velocity particles may directly hit a sealing interface and possibly damage and increase a risk to the conventional flow manifolds functionality.

In conventional methods, the flow bores or pipes may have a corrosion resistant alloy ("CRA") layer applied thereto to act as a sacrificial surface. The CRA layer may have increased thickness for further resistance. In addition to the CRA layer, target tees may be used to damp the flow by reducing velocities. With the combination of the long straight flow bores or pipes, the CRA layer, and target tees, the erosion effect may be reduced and be more evenly distributed. Further, erosion sensitive components within the conventional flow manifolds may also need to be rearranged limiting the systems design in order to avoid erosion. However, the conventional methods of combining the use of the long straight flow bores or pipes, the CRA layer, and target tees increase the total cost, envelope and weight of the conventional flow manifolds.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a valve block that may have a cross-drill intersection bore formed within the valve block by a first flow bore intersecting a second flow bore. Additionally, at least one insert may be within the first flow bore or the second flow bore. The at least one insert may include a wall contacting an inner surface of the first flow bore or the second flow bore, a passageway defined within the wall and having openings at opposite ends of the insert, and a plurality of vanes extending from an inner surface of the wall into the passageway. The one of the opposite ends of the at least one insert may align with a surface of the cross-drill intersection bore.

In another aspect, the embodiments disclosed herein relate to a method for manufacturing a valve block. The method may include machining at least two intersecting flow bores in a body of the valve block, the at least two intersecting flow bores including a first flow bore intersecting with a second flow bore at a cross-drill intersection bore; positioning at least one insert within the first flow bore or the second flow bore to have an end of the at least one insert aligned with a surface of the cross-drill intersection bore; and welding the at least one insert within the first flow bore or the second flow bore. The at least one insert may include an outer wall welded to an inner surface of the first flow bore or the second flow bore; a passageway defined through the outer wall and having openings at opposite ends of the at least one insert; and a plurality of vanes extending from an inner surface of the outer wall of the at least one insert.

In yet another aspect, the embodiments disclosed herein relate to a first fluid conduit intersecting a second fluid conduit. The first fluid conduit may include a plurality of vanes extending through the first fluid conduit from a first portion of the first fluid conduit in a direction parallel or angled with a central axis of the first fluid conduit to a second portion of the first fluid conduit; each vane extending along parallel planes with each other and extending between opposite sides of the inner surface of the first fluid conduit.

Other aspects and advantages will be apparent from the following description and the appended claims.

DETAILED DESCRIPTION

Figure 1:
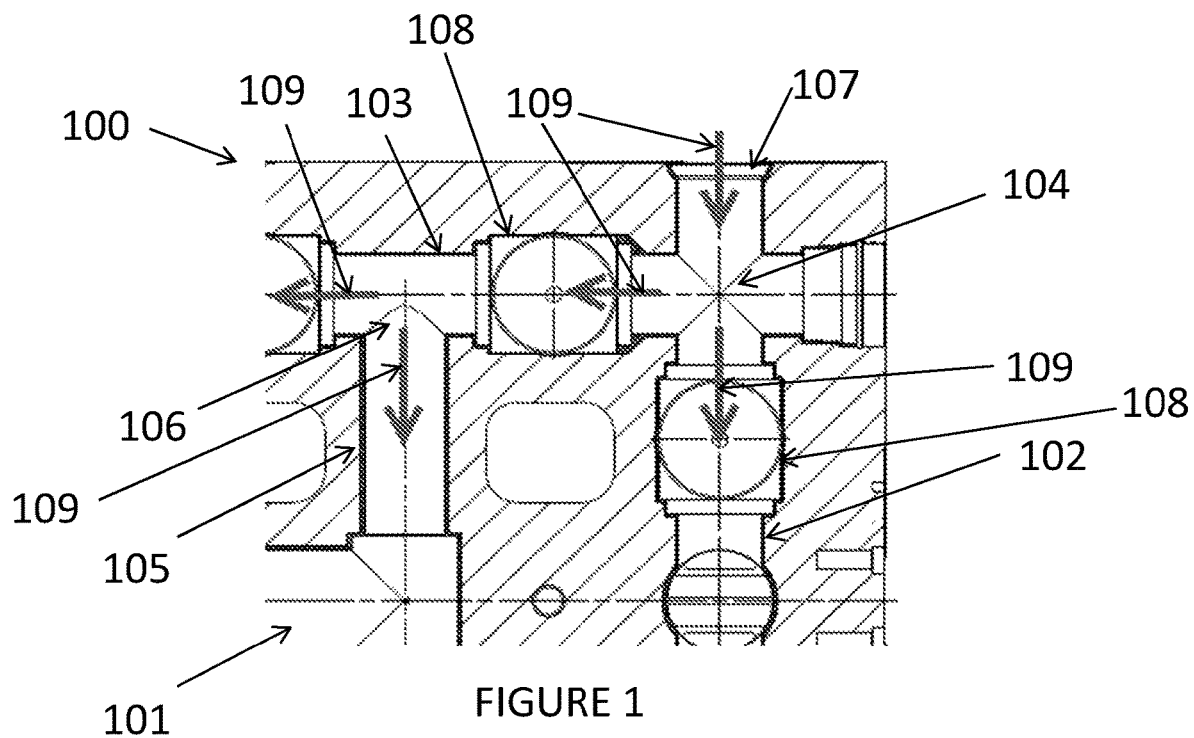
FIG. 1 illustrates a cross-sectional view of a valve block in accordance with one or more embodiments of the present disclosure.

Embodiments of the present disclosure are described below in detail with reference to the accompanying figures. In the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description. As used herein, the term "coupled" or "coupled to" or "connected" or "connected to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

In one aspect, embodiments disclosed herein relate to inserts within a flow bore of a valve block. An insert may also be interchangeably referred to as a guide vane insert in the present disclosure. Additionally, a valve block may also be interchangeably referred to as a flow manifold or flow control module assembly or a Christmas tree in the present disclosure, and may or may not include valves disposed therein. Further, embodiments disclosed herein may include a block with at least one flow bore that may control and regulate the flow of fluids for purposes of either injecting fluid (e.g., frac fluid) into an injection well or recovering fluid (e.g., hydrocarbons or other reservoir fluid) from a production well. Additionally, a cross-drill intersection bore may be formed within a valve block by a first flow bore intersecting a second flow bore. In addition, any terms designating valve block or flow manifold (e.g., any wellheads or frac valves) at a rig type (e.g., any land rig or offshore rig) should not be deemed to limit the scope of the disclosure. It is to be further understood that the various embodiments described herein may be used in various stages of a well, such as rig site preparation, drilling, completion, abandonment etc., and in other environments, such as workover rigs, fracking installation, well-testing installation, oil and gas production installation, without departing from the scope of the present disclosure. It is recognized by the different embodiments described herein that a flow manifold or valve block plays a valuable and useful role in the life of a well. Further, it is recognized that the fluid flow configuration and arrangement of components for a valve block according to one or more embodiments described herein may provide a cost effective alternative to conventional valve blocks. The embodiments are described merely as examples of useful applications, which are not limited to any specific details of the embodiments herein.

Guide vane inserts, according to embodiments herein, are apparatuses that include vanes extending from a body of the inserts and into a passageway of the inserts. The guide vane inserts may be removably attached or fixed within components having a flow path for fluids, such as a flow bore or valve, that are arranged in a certain layout and contained within a valve block or flow manifold. The flow bores included in valve blocks may be used to direct fluid produced from or injected into a well. As used herein, fluids may refer to slurries, liquids, gases, and/or mixtures thereof. In some embodiments, solids may be present in the fluids. When fluids flow through the passageway of the inserts, the vanes of the inserts may turn the flow of the fluids to be more uniform and steady. By creating a more uniform and steady flow, the guide vane inserts may significantly reduce erosion rates within the valve block and increase equipment functionality for longer periods of time, and may also allow for significant reduction in the complexity, design, and weight of the valve block. It is further envisioned that the guide vane inserts may also be used to deflect erosion agents from sensitive areas and/or act as sacrificial elements which will sustain high erosion rates in place of other more critical areas of the valve block or components such as valves or sensors.

In addition, one or more valves may be disposed or integrated with one or more of the flow bores to direct the fluids within the valve block. Further, one or more flow meters may be integrated with one or more of the flow bores of a flow control module. Furthermore, one or more chokes may be coupled to one of the flow bores of the valve blocks. As known in the art, a choke may be an apparatus used to control pressure of fluid flowing through the choke and also may control a back pressure in the upstream fluid. Other instruments and devices, including without limitation, sensors and various valves may be incorporated within a valve block according to embodiments of the present disclosure.

Conventional valve blocks in the oil and gas industry are typically very large and heavy. Conventional valve blocks may include an extensive layout and arrangement of pipes that weigh several tons each. In some instances, a pipe used to direct fluid into another pipe may be ten inches in diameter and may include complicated bends or changes in orientation. Such valve blocks may be both heavier in weight and may also be more expensive to manufacture because of the higher number of parts and components. For example, flow bores in conventional valve blocks may be machined or manufactured to have a longer length and/or CRA layers in order to mitigate erosion rates of the flow bores. This additional length and/or CRA layers needed to account for erosion effects due to fluid flow adds to the weight, size, manufacture costs and time, repair time, and overall cost of valve blocks.

Accordingly, one or more embodiments in the present disclosure may be used to overcome such challenges as well as provide additional advantages over conventional valve blocks. In one or more embodiments, valve blocks with one or more inserts may be lighter in weight and lower in cost as compared with conventional valve blocks due, in part, to including an insert of the present disclosure within one or more flow bores of the valve block to reduce erosion rates rather than increasing the size and complexity of the flow manifold. As discussed herein, fixing or removably attaching an insert within one or more of the flow bores may create a more uniform and steady flow within the flow bores to reduce erosion rates as well as deflect particles and/or act as a sacrificial element. Additionally, the guide vane insert may comprise components that are forged and/or machined, and thus may be easily installed within the flow bores, relaxing control tolerances and improving manufacture (e.g., reduced cost and reduced time to manufacture). It is further envisioned that the guide vane insert may be manufactured by additive manufacturing such as 3-D printing, powder metallurgy, casting or injection molding. Furthermore, by having the guide vane insert within one or more flow bores, the valve block may be manufactured to minimize or eliminate the need for long length flow bores and/or applying additional CRA layers to a surface of the flow bores for erosion allowance. Overall the guide vane insert may minimize product engineering, risk associated with erosion in flow bores, reduction of assembly time, hardware cost reduction, and weight and envelope reduction.

Further, according to embodiments of the present disclosure, a guide vane insert may be integrated with a pig bar insert disposed in the flow bore of the valve block instead of requiring additional manufacturing, thus reducing cost and weight of such a valve block. In a non-limiting example, a structure and installation of the pig bar insert in accordance with the present disclosure may utilize the pig bar insert systems and methods, according to the systems and methods as described in World Intellectual Property Organization ("WIPO") Patent Application No. PCT/BR2016/050153, of which the entire teachings are incorporated herein by reference.

Turning to FIG. 1, FIG. 1 shows a cross-sectional view of a valve block 100 in accordance with one or more embodiments of the present disclosure. In one or more embodiments, the valve block 100 may be coupled to well equipment, such as a well head (not shown). As known in the art, a well head may be a structure useful for producing fluid or injecting fluid into a well, and is often a complex configuration of actuated valves and other components having various functions relevant to the well. In some embodiments, the valve block 100 may be coupled to frac equipment. In addition, the valve block 100 may be arranged in series to distribute and manage fluid flow over a wider area in some instances and to connect to multiple pieces of equipment. In one or more embodiments, the valve block 100 may be used to direct fluid flowing from in or out of the well to another structure or distribution point for storage and/or processing.

In one or more embodiments, the valve block 100 may have a fluid conduit, such as one or more flow bores 101. In a non-limiting example, a first flow bore 102 may intersect a second flow bore 103 to form a first cross-drill intersection bore 104. Additionally, a third flow bore 105 may also intersect the second flow bore 103 to a form a second cross-drill intersection bore 106. It is noted that three flow bores (102, 103, 105) and two cross-drill intersection bores (104, 106) in the valve block 100 are shown for example purposes only, and the valve block 100 may have any number of flow bores and cross-drill intersection bores without departing from the scope of the disclosure. Additionally, the valve block 100 may include more than one inlet or outlet 107, such as two, three, or more inlets or outlets 107. In addition, the valve block 100 may have one or more valves 108 to direct the flow traveling through the one or more flow bores 101. In a non-limiting example, a fluid may enter the valve block 100 through the inlet 107. From the inlet 107, the fluid may flow through the first cross-drill intersection bore 104, the first flow bore 102, the second flow bore 103, the third flow bore 105 and/or the second cross-drill intersection bore 106 in a direction indicated by arrows 109. It is further envisioned that the direction of arrows 109 may be reversed or the flow of fluids may be redirected by opening or closing the one or more valves 108. As will be described herein, a guide vane insert may be provided in any of the one or more flow bores 101 of the valve block 100. Furthermore, one skilled in the art will appreciate how the flow bores (101, 102, 103, 105) and the cross-drill intersection bores (104, 106) of valve block 100 may be cladded with a corrosion resistant alloy.

Figure 2:
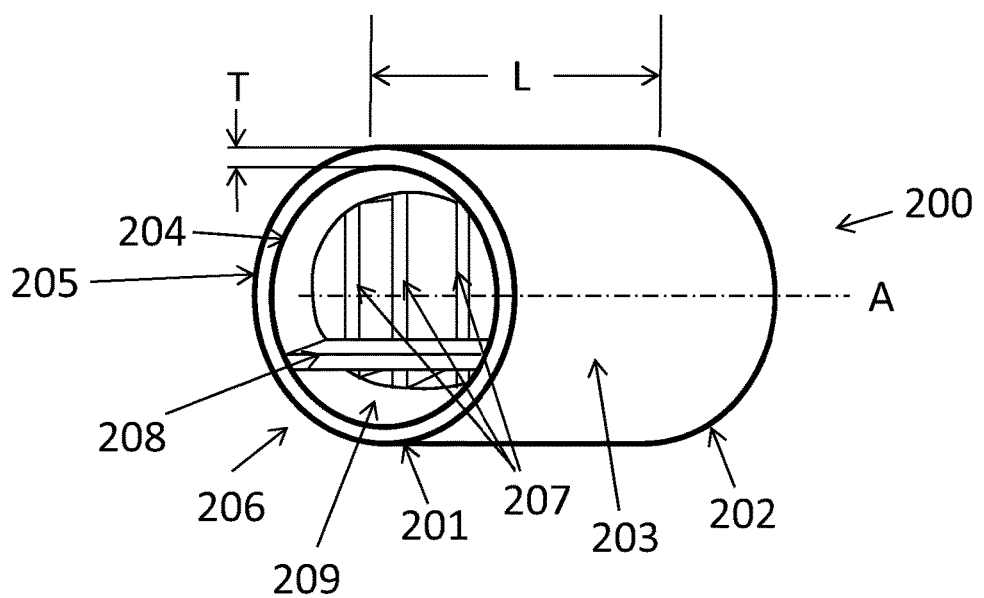
FIG. 2 illustrates a perspective view of a guide vane insert in accordance with one or more embodiments of the present disclosure.

As seen by FIG. 2, in one or more embodiments, a guide vane insert 200 may extend a length L from a first end surface 201 to a second end surface 202. One skilled in the art will appreciate how the length L of the guide vane insert 200 may be any length to fit in the flow bores (e.g., 101, 102, 103, 105 in FIG. 1) of a valve block (e.g., 100). Additionally, the guide vane insert 200 may have a wall 203 with a thickness T measured from an inner surface 204 of the wall 203 to an outer surface 205 of the wall 203. In a non-limiting example, the thickness T of the guide vane insert 200 may have a value that is less than or equal to five percent of an inner diameter of a fluid conduit that the guide vane insert 200 is inserted within (or less than or equal to five percent of the diameter measured between the outer surface 205 of the wall 203). In some embodiments, the thickness T of the guide vane insert may have a value ranging from a lower limit selected from 0.5%, 1%, 2% and 3% of the insert diameter measured between its outer surface to an upper limit selected from 5%, 6%, 8% and 10% of the insert diameter measured between its outer surface, where any combination of lower limit and upper limit may be selected.

Further, the inner surface 204 may define a passageway 206 within the wall 203 and the passageway 206 may have openings at the first end surface 201 and the second end surface 202 opposite each other. The passageway 206 may allow for fluids to pass through the guide vane insert 200.

In some embodiments, the guide vane insert 200 may have a plurality of vanes 207 extending in the same direction from the inner surface 204 of the wall 203 into the passageway 206. The vanes 207 shown in FIG. 2 form a grating within the insert 200, where the vanes 207 are a plurality of regularly spaced, parallel, elongated elements. In a non-limiting example, the guide vane insert 200 may be provided with three vanes 207 spaced equal distances from each other in a radial direction of the guide vane insert 200. While it is noted that three vanes 207 are shown, the guide vane insert 200 may include any number of vanes spaced equally or unequally spaced apart without departing from the scope of the disclosure. Additionally, the plurality of vanes 207 may each have a length extending axially within the guide vane insert 200. In a non-limiting example, the length of the plurality of vanes 207 may be shorter than the length L of the guide vane insert 200. It is further envisioned that the plurality of vanes 207 may extend in a direction perpendicular to a radial cross section of the insert wall 203. The plurality of vanes 207 may be parallel with each other and each may have a height extending between opposite sides of the inner surface 204 of the wall 203. For example, in the embodiment shown in FIG. 2, a central vane may have a height extending the inner diameter of the insert, and the remaining vanes may have a height extending a chord of the insert inner diameter, where each of the vanes form parallel planes with each other.

Further, in some embodiments, the plurality of vanes 207 may be angled from a longitudinal axis A of the guide vane insert 200 such that the plurality of vanes 207 may be slanted within the passageway 206. Additionally, the plurality of vanes 207 may have different angles between each other and the axis A. Furthermore, each of the plurality of vanes 207 may have equal thicknesses.

Still referring to FIG. 2, in one or more embodiments, at least one pig bar 208 may be provided within the guide vane insert 200 in a first portion 209 of the passageway 206. The first portion 209 may be an area of the insert 200 extending a length from the first end surface 201, e.g., a length from the first end surface 201 to an end of the plurality of vanes 207. In a non-limiting example, the pig bar 208 may extend longitudinally in a direction perpendicular to the plurality of vanes 207 between the inner surface 204 of the wall 203. In some embodiments, the pig bar 208 may extend a depth equal to a full length of the first portion 209, from the first end surface 201 to the end of the plurality of vanes 207. In some embodiments, the pig bar 208 may extend a depth less than the full length of the first portion 209. The pig bar 208 depth may extend in a direction parallel with the direction of the central longitudinal axis of the insert, or in some embodiments, may extend in a direction at an angle from the direction of the central longitudinal axis of the insert. Additionally, the pig bar 208 may be positioned at any height within the passageway 206, e.g., below the longitudinal axis of the insert (as shown in FIG. 2), at the same height as the longitudinal axis, or above the longitudinal axis.

In accordance with one or more embodiments, the guide vane insert 200 may be forged, machined, formed by additive manufacturing from a material selected from metal materials, plastic materials, carbon fiber materials, composite materials, ceramics, or structural insulating materials (e.g., using a 3D printing process). In a non-limiting example, the guide vane insert 200 may be the same material as the valve block. Additionally, the guide vane insert 200 may be coated in an anti-corrosion material. It is further envisioned that the guide vane insert 200 may be made out of any material and then coated with an erosion resistant layer of materials such as tungsten carbide. In some embodiments, the guide vane insert 200 may be machined, forged, or formed by additive manufacturing as one integrated piece or may have the plurality of vanes 207 and/or the pig bar 208 removably attached thereto.

Figure 3:
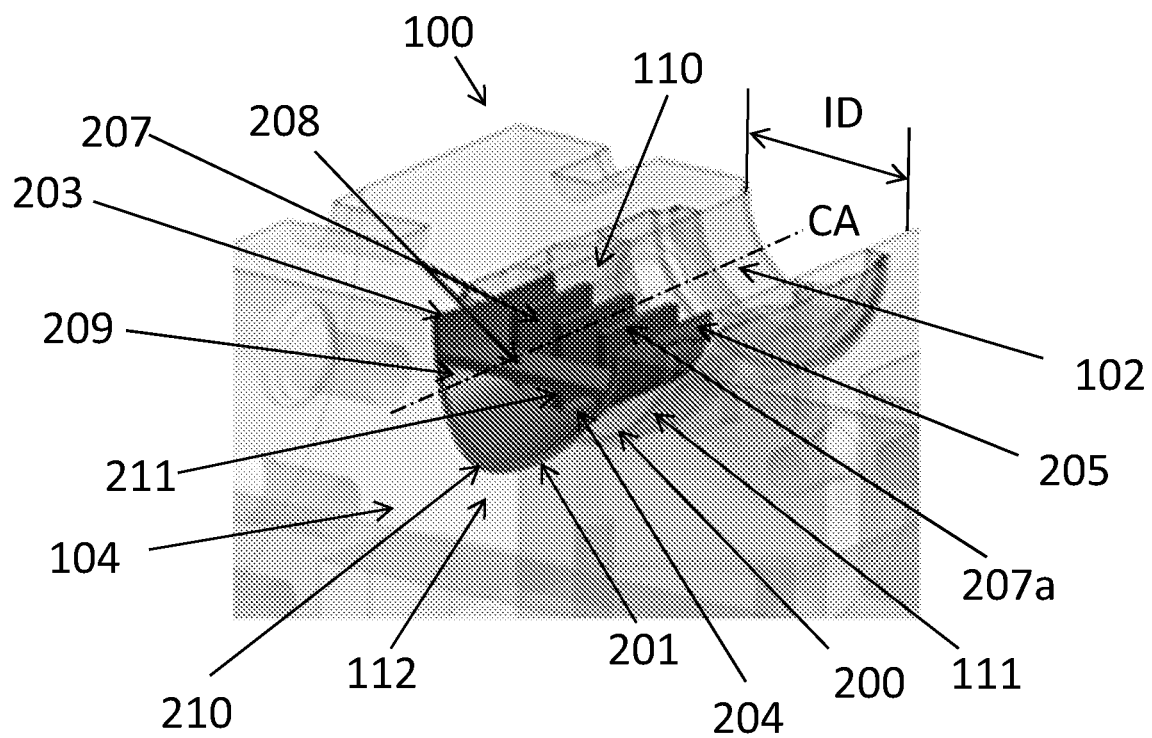
FIG. 3 illustrates a cross-sectional perspective view a guide vane insert within a valve block in accordance with one or more embodiments of the present disclosure.

Now referring to FIG. 3, FIG. 3 illustrates a perspective cross-section view of the guide vane insert 200 within the valve block 100 in accordance with one or more embodiments of the present disclosure. In a non-limiting example, the guide vane insert 200 may be within a first flow bore 102 of the valve block 100. While it is noted that FIG. 3 shows the guide vane insert 200 in the first flow bore 102, the guide vane insert 200 may be in any flow bore of the valve block 100 without departing from the scope of the disclosure. The outer surface 205 of the wall 203 may contact an inner surface 110 of the first flow bore 102. It is further envisioned the outer surface 205 may be machined to match the shape of the inner surface 110 of the first flow bore 102. For example, the insert 200 may have a wall outer surface 205 that corresponds in size and shape with a portion of the inner surface 110 of the first flow bore 102, such that the insert 200 fits within the portion of the first flow bore 102 in a secured manner (including manufacturing tolerances).

In some embodiments, the inner surface 110 of the first flow bore 102 may have a groove 111 for the guide vane insert 200 to fit into. It is further envisioned that one or more seals may be disposed between the guide vane insert 200 and the first flow bore 102 to ensure there is a complete seal between the bodies (between the outer surface of the insert wall 203 and inner surface 110 of the first flow bore 102) and preventing flow between said bodies. One skilled in the art will appreciate how the guide vane insert 200 may be fixed or removably attached to the first flow bore 102 using various methods as known in the art, including without limitation welding, mechanical fasteners, integrally forming, adhesives, and other known methods or combination thereof. Additionally, the central longitudinal axis (see A in FIG. 2) of the guide vane insert 200 may be positioned to be concentric with a central axis CA of the first flow bore 102. It is further envisioned that in the process of manufacturing the valve block 100, the cladding of the flow bores (101, 102, 103, 105) and the cross-drill intersection bores (104, 106) of valve block 100 may be done after or during the welding of the guide vane insert 200. One skilled in the art will appreciate how the guide vane insert 200 may be removable to allow for repairs and/or replacement of the guide vane insert 200. According to some embodiments, with the guide vane insert 200 inserted in the first flow bore 102, the thickness (see T in FIG. 2) of the wall 203 may reduce an inner diameter ID of the first flow bore 102, for example, by up to five percent, up to ten percent, or up to fifteen percent.

In a non-limiting example, each of the vanes 207 may have a planar wall 207a positioned along parallel planes with each other. Additionally, the planar wall 207a may extend a direction parallel with the central axis CA of the first flow bore 102 and from opposite radial ends of the inner surface 204 of the wall 203. Further, the pig bar 208 may be extend from a first end 211 of the plurality of vanes 207 to the first end surface 201 of the guide vane insert 200 such that the pig bar 208 is proximate the end of guide vane insert 200 and aligned with the first cross-drill intersection bore 104. In some embodiments, the pig bar 208 may be proximate an end of the guide vane insert 200 opposite of the first cross-drill intersection bore 104. In addition, the pig bar 208 may have a length extending in a direction perpendicular to the planar walls 207a of the plurality of vanes 207 and between opposite sides of the inner surface 204.

According to embodiments of the present disclosure, walls of an insert may have different profile shapes. For example, in the embodiment shown in FIG. 3, the vanes 207 of the insert have planar walls 207a. In other embodiments, vanes of an insert may have non-planar walls. For example, an insert may have one or more vanes having an airfoil shape. In another example, an insert may have one or more vanes having a twisted or spiral-like shape.

In one or more embodiments, the first end surface 201 of the guide vane insert 200 may align with a surface 112 of the first cross-drill intersection bore 104 such that the plurality of vanes 207 and/or the pig bar 208 of the guide vane insert 200 may not be within the first cross-drill intersection bore 104. In a non-limiting example, the first end surface 201 may be curved to match surface 112 of the first cross-drill intersection bore 104 such that the first portion 209 of the guide vane insert 200 may be enlarged and flare outward. As further shown by FIG. 3, one skilled in the art will appreciate how the first portion 209 may include an over-thickness portion 210 to further seal the wall 203 against the inner surface 110 of the first flow bore 102.

Figure 4:
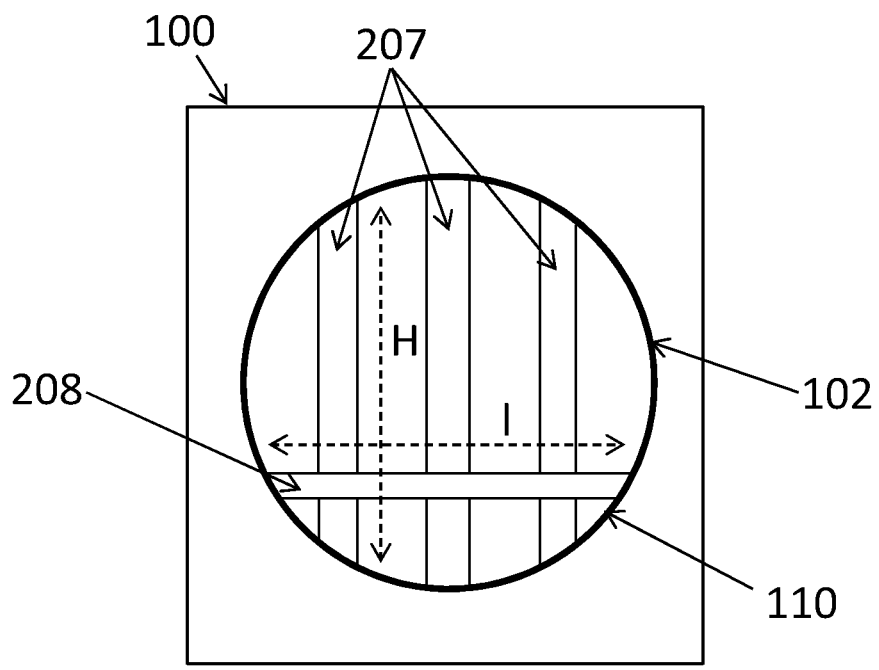
FIG. 4 illustrates a front view of a guide vane insert within a valve block in accordance with one or more embodiments of the present disclosure

In some embodiments, the guide vane insert 200 may be integrated within the first flow bore 102. As seen in FIG. 4, a front view an integrated guide vane insert within the first flow bore 102 of valve block 100 is illustrated in accordance with one or more embodiments of the present disclosure. In such an embodiment, the wall (203) of guide vane insert (200) may in fact be the inner surface 110 of the first flow bore 102 such that the plurality of vanes 207 and the pig bar 208 may directly contact the inner surface 110 of the first flow bore 102. The vanes 207 may extend a height H in a direction perpendicular to the direction of the central axis of the first flow bore 102 and may extend a length (not shown from the front view) in a direction parallel with the direction of the central axis of the first flow bore 102. The pig bar 208 may extend a length 1 in a direction perpendicular to both the height H of the vanes and the direction of the central axis.

Figure 5A:
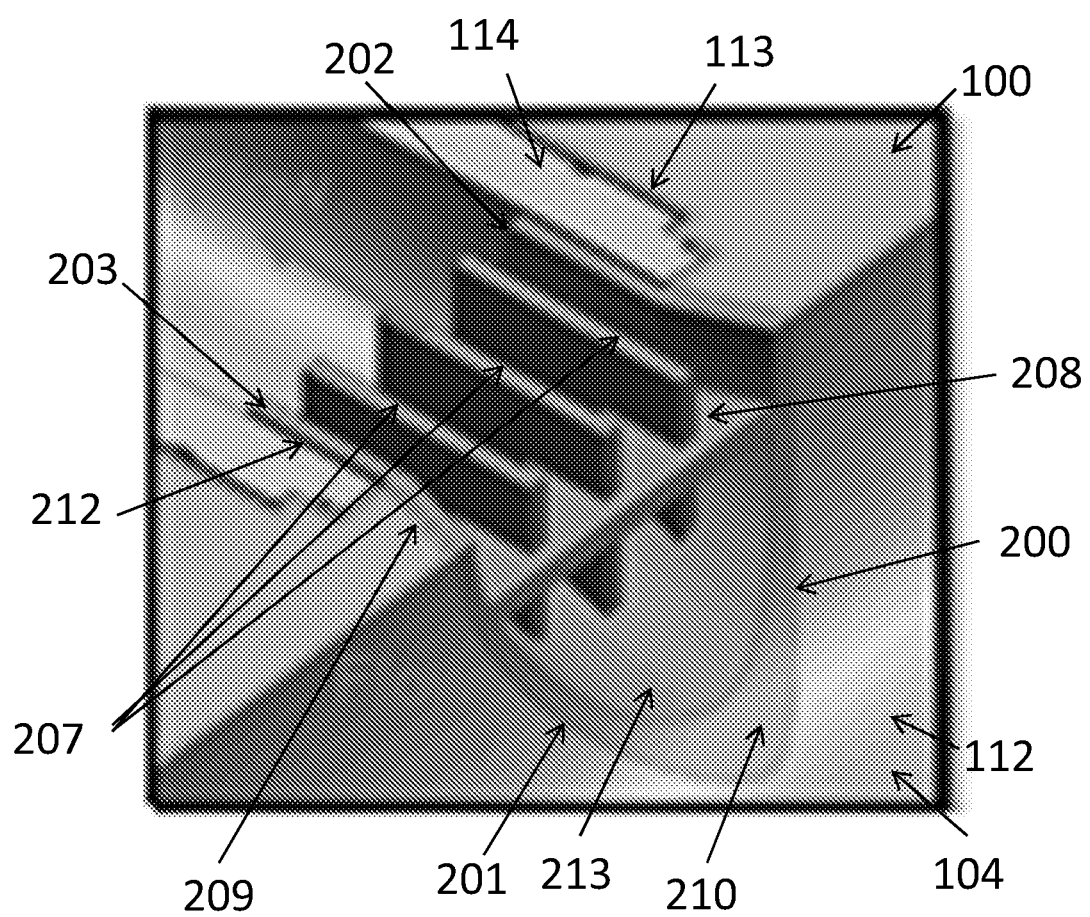
FIGS. 5A and 5B illustrate a guide vane insert with a pig bar within a valve block in accordance with one or more embodiments of the present disclosure.
Figure 5B:
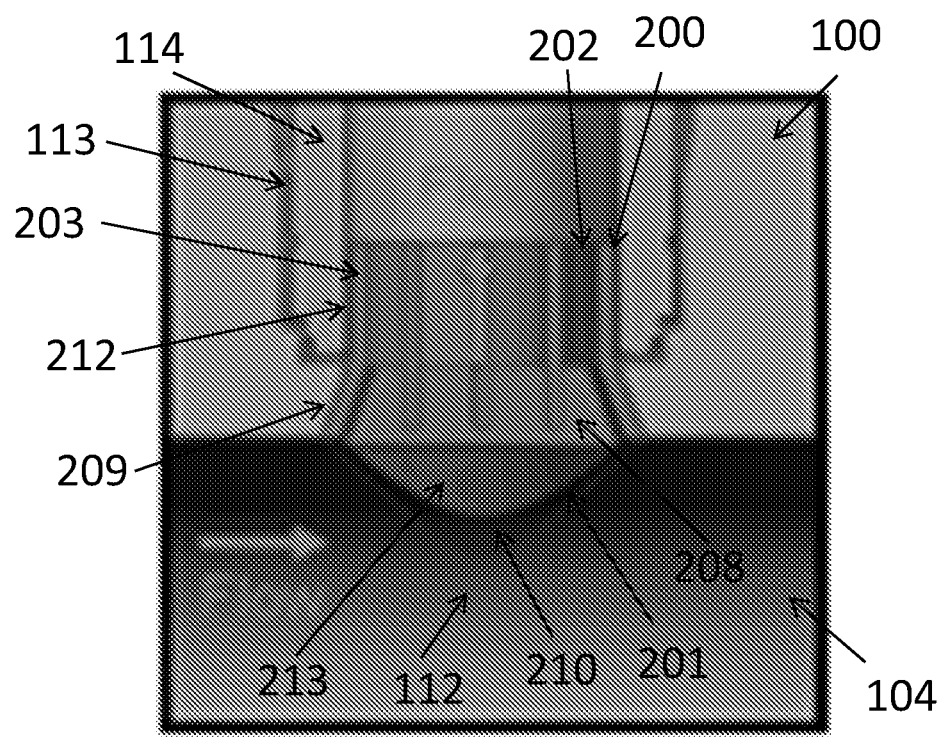

Now referring to FIGS. 5A and 5B, a valve seat 114 may be formed in a first fluid conduit 113 of the valve block 100 in accordance with one or more embodiments of the present disclosure. In a non-limiting example, a second portion 212 of the guide vane insert 200 may extend into the valve seat 114 from the first portion 209 to the second end surface 202.

The wall 203 of guide vane insert 200 may have a constant inner and/or outer diameter throughout the second portion 212. It is further envisioned that the second portion 212 of the guide vane insert 200 may be fully within the first fluid conduit 113 and the first portion 209 of the guide vane insert 200 may exit the first fluid conduit 113 to directly contact the valve block 100. Additionally, the wall 203 of the insert defining the first portion 209 may be angled outwardly from the second portion 212 to the surface 112 of the first cross-drill intersection bore 104 such that the first portion 209 is flared. By angling the wall 203 in the first portion 209, the inner and outer diameter of the wall 203 in the first portion 209 may progressively increase from the constant inner/outer diameter throughout the second portion 212 to a maximum inner/outer diameter of the wall 203 at the first end surface 201 aligned with the first cross-drill intersection bore 104.

In one or more embodiments, the first portion 209 may include a slanted inner surface 213 that is sloped to align with a curvature of the surface 112 of the first cross-drill intersection bore 104. Additionally, the over-thickness portion 210 of the wall 203 may extend from the slanted inner surface 213 such that the first end surface 201 may be curved to align with the curvature of the surface 112 of the first cross-drill intersection bore 104.

As further shown in FIGS. 5A and 5B, the plurality of vanes 207 may extend from the second end surface 202 a full length of the second portion 212 and into the first portion 209. In some embodiments, the plurality of vanes 207 may intersect with the pig bar 208 within the first portion 209 such that each of the vanes 207 are interlocked with the pig bar 208. In other words, the length of the vanes 207 may overlap with the depth of the pig bar 208. It is further envisioned that ends of each of the vanes 207 in the passageway 206 may be a straight edge such that one end of the plurality of vanes 207 aligns with the second end surface 202 and an opposite end of the plurality of vanes 207 is within the first portion 209 of the wall to have the plurality of vanes 207 fully enclosed within the wall 203. One skilled in the art will appreciate that the guide vane insert 200 installed in the valve block may steady a flow of fluids through the valve block. In a non-limiting example, the fluids flow (e.g., in a direction of arrows labeled Flow) from the first cross-drill intersection bore 104 and turning into the valve seat 114 or vice versa. As the fluids flow in the valve seat 114, the fluids travel through the passageway 206 of the guide vane insert 200. The plurality of vanes 207 within the passageway 206 may disrupt the flow of the fluids such that a velocity of the fluid may increase and create turbulent flow through the insert, and thereby may deflect particles away from sensitive areas and may also act as sacrificial elements.

According to embodiments of the present disclosure, inserts may be positioned at least partially in different components of a flow module, such as valve seats or flow bores. For example, as shown in FIGS. 5A and 5B, an insert may extend partially into a valve seat. Further, in some embodiments, an insert may be a separate component positioned at least partially in another component of a flow module. In some embodiments, an insert of the present disclosure may be integrally formed with a component of the flow module (e.g., valve seat).

Figure 6A:
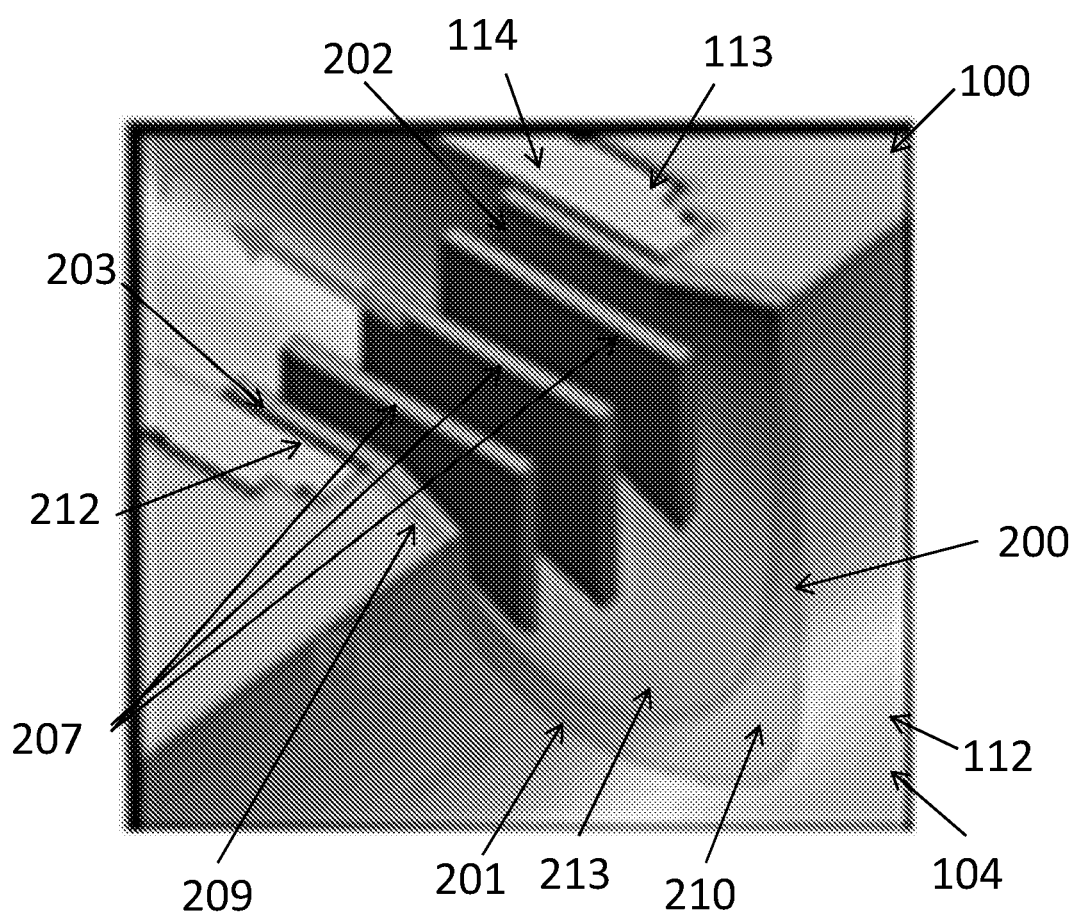
FIGS. 6A and 6B illustrate a guide vane insert without a pig bar within a valve block in accordance with one or more embodiments of the present disclosure.
Figure 6B:
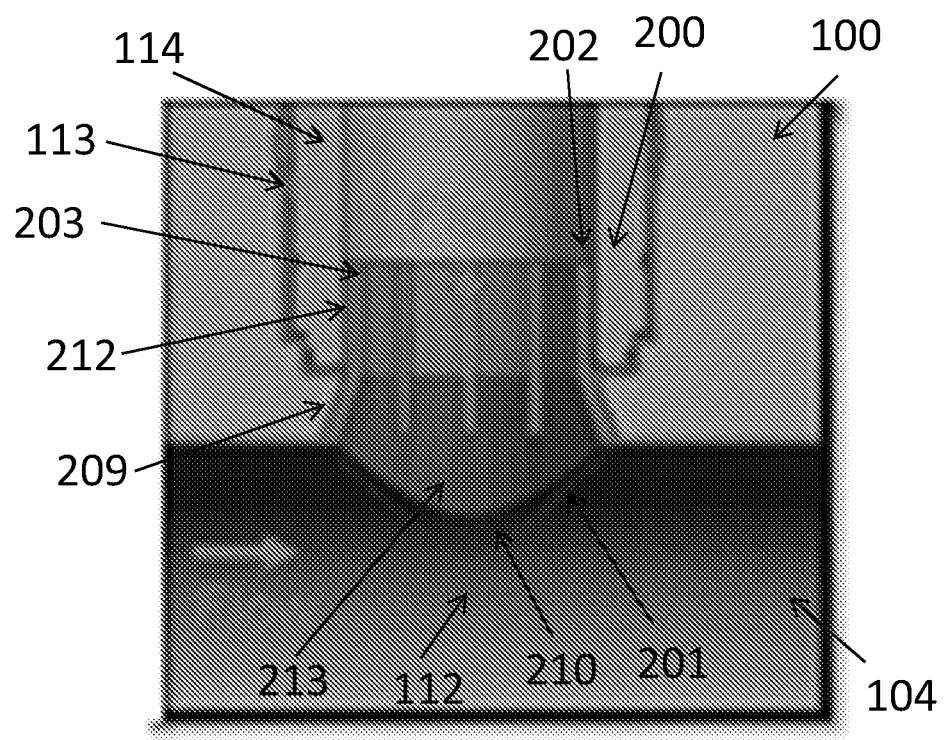

Referring now to FIGS. 6A and 6B, another embodiment of a guide vane insert according to embodiments herein is illustrated, where like numerals represent like parts. The embodiment of FIGS. 6A and 6B is similar to that of the embodiment of FIGS. 5A and 5B, where a plurality of vanes 207 extend a length through the insert in a longitudinal direction parallel with the longitudinal axis of the insert 200. However, the guide vane insert 200 may only have the plurality of vanes 207 without a pig bar.

Figure 7A:
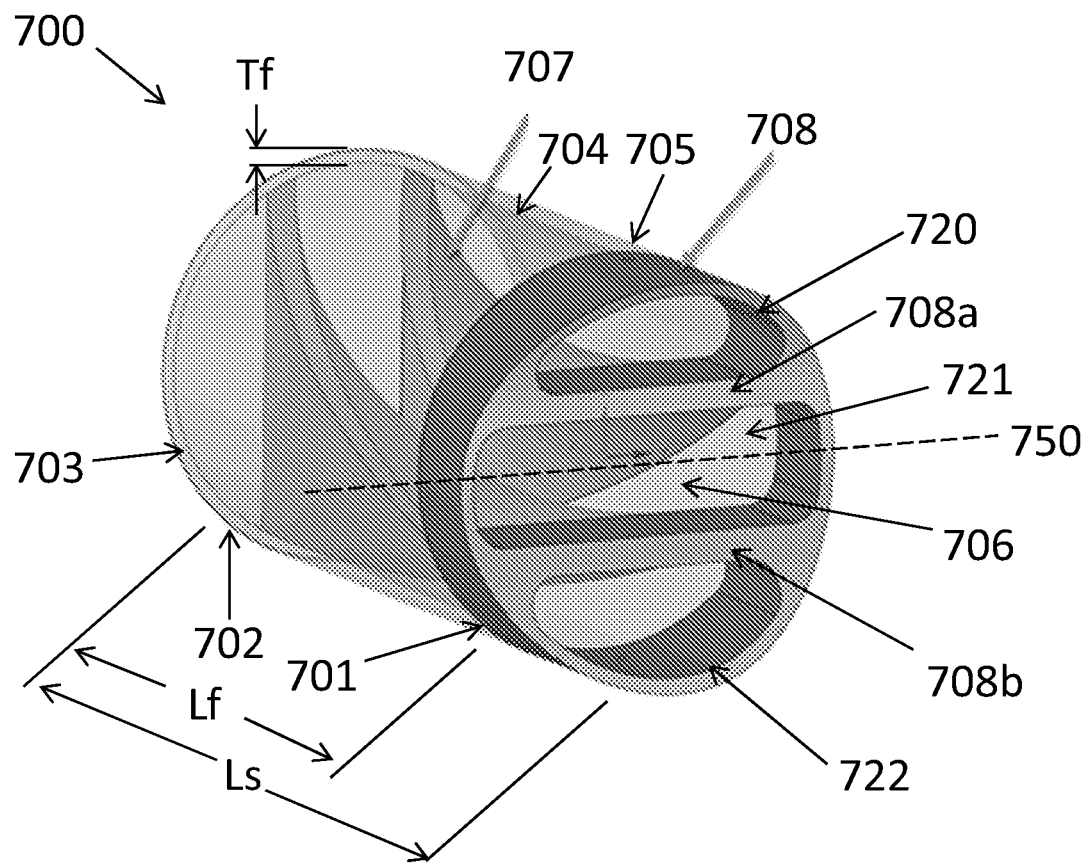
FIGS. 7A and 7B illustrate a perspective view of a guide vane insert in accordance with one or more embodiments of the present disclosure.
Figure 7B:
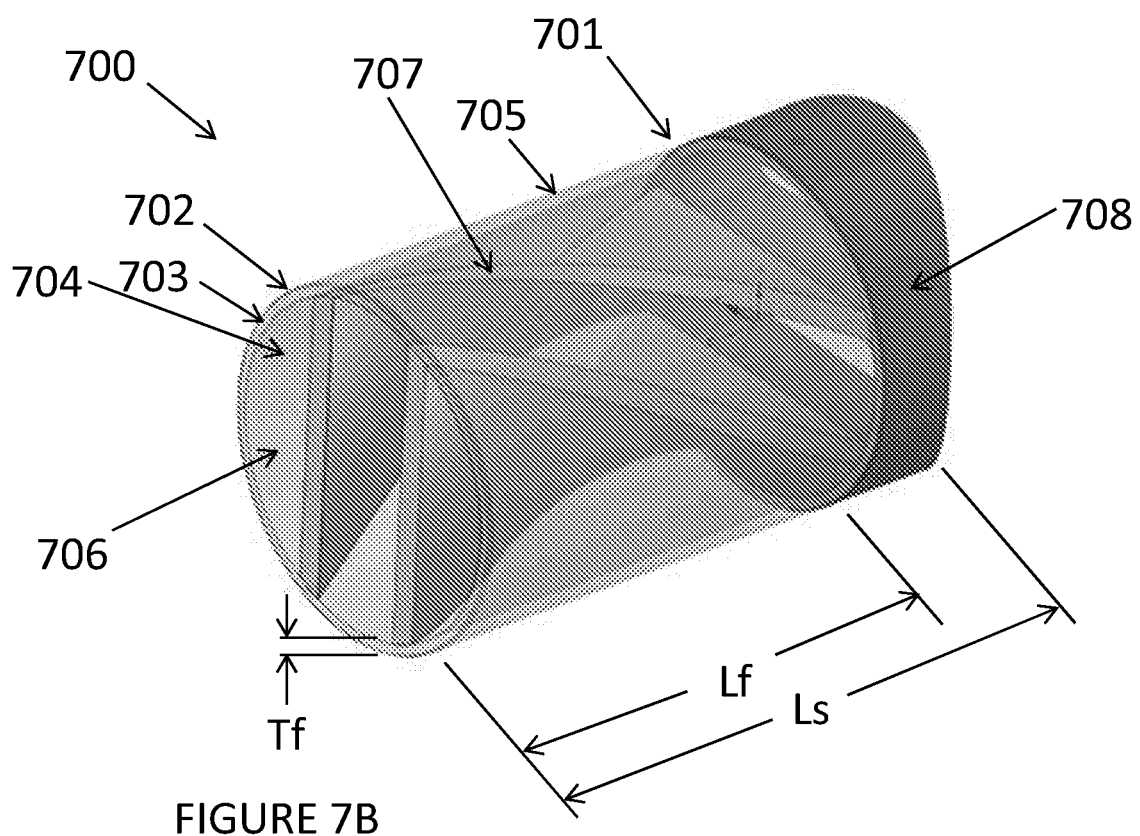

Referring now to FIGS. 7A and 7B, another embodiment of a guide vane insert 700 according to embodiments herein is illustrated. The embodiment of FIGS. 7A and 7B is similar to that of the embodiment of FIGS. 2-6B, in that a plurality of vanes extend longitudinally through a length of an insert. In FIGS. 7A and 7B, the portion of the insert wall surrounding the vanes is presented transparently in order to see the configuration of the vanes therein.

As seen by FIGS. 7A and 7B, in one or more embodiments, the guide vane insert 700 may extend a first length $L_f$ from a first end 701 to a second end 702. One skilled in the art will appreciate how the length $L_f$ of the guide vane insert 700 may be any length to fit in the flow bores (e.g., 101, 102, 103, 105 in FIG. 1) of a valve block (e.g., 100). Additionally, the guide vane insert 700 may have a wall 703 with a first thickness $T_f$ measured from an inner surface 704 of the wall 703 to an outer surface 705 of the wall 703. In a non-limiting example, the first thickness $T_f$ of the guide vane insert 700 may have a value that is less than or equal to five percent of an inner diameter of a fluid conduit that the guide vane insert 700 is inserted within (or less than or equal to five percent of the diameter measured between the outer surface 705 of the wall 703). In some embodiments, the thickness $T_f$ of the guide vane insert may have a value ranging from a lower limit selected from 0.5%, 1%, 2% and 3% of the insert diameter measured between its outer surface to an upper limit selected from 5%, 6%, 8% and 10% of the insert diameter measured between its outer surface, where any combination of lower limit and upper limit may be selected.

Further, the inner surface 704 may define a passageway 706 within the wall 703 and the passageway 706 may have openings at the first end 701 and the second end 702 opposite each other. The passageway 706 may allow for fluids to pass through the guide vane insert 700.

In some embodiments, the guide vane insert 700 may have a plurality of vanes 707 extending in the same direction from the inner surface 704 of the wall 703 into the passageway 706. In a non-limiting, the plurality of vanes 707 may extend in any direction in an X-axis, Y-axis and Z-axis within the passageway 706. In addition, the guide vane insert 700 may be provided with two vanes 707 spaced equal distances from each other in a radial direction of the guide vane insert 700. While it is noted that two vanes 707 are shown, the guide vane insert 700 may include any number of vanes spaced equally or unequally spaced apart without departing from the scope of the disclosure. Additionally, the plurality of vanes 707 may each have a length extending axially within the guide vane insert 700. In a non-limiting example, the length of the plurality of vanes 707 may be shorter than the first length $L_f$ of the guide vane insert 700.

In one or more embodiments, the plurality of vanes 707 may include a change in direction (e.g., twist) along its length. For example, the plurality of vanes 707 may have a first end at the first end surface 701 extending in a direction parallel to a radial cross section 750 of the insert, and a second end at the second end surface 702 may extend in a non-parallel direction (e.g., perpendicular) to the radial cross section 750 of the insert wall 703. With the change in direction, the plurality of vanes 707 may have a twisted or helix shape within the passageway 706. In embodiments having one or more twisted vanes extending through a length of the insert, the vane(s) may intersect with the inner surface 704 of the insert wall along a helix or spiral pattern.

In some embodiments, vanes 707 having a change in direction along its length may be parallel with each other, where each vane 707 has corresponding changes in direction along its length to follow in parallel directions with each other. Further, vanes 707 having a change in direction along its length may each have a height extending between opposite sides of the inner surface 704 of the wall 703. For example, in the embodiment shown in FIGS. 7A and 7B, the two vanes 707 may have a height extending a chord of the insert inner diameter, where each of the vanes are parallel with each other. Furthermore, each of the plurality of vanes 707 may have equal thicknesses.

Still referring to FIGS. 7A and 7B, in one or more embodiments, the guide vane insert 700 may have a pig bar assembly 708 at the first end 701. The pig bar assembly 708 may be removably attached or integrated to the first end 701 such that the guide vane insert 700 has a second length Ls which is greater than the first length Lf. The pig bar assembly 708 may have an outer diameter equal to the outer diameter of the insert wall 703 surrounding the vanes 707. The pig bar assembly 708 may include a first pig bar 708a and a second pig bar 708b extending a depth from the first end 701 to an opposite end. In addition, the first pig bar 708a and the second pig bar 708b may be spaced equal distances from each other in a radial direction of the guide vane insert 700. While it is noted that two pig bars (708a, 708b) are shown, the pig bar assembly 708 may include any number of pig bars spaced equally or unequally spaced apart without departing from the scope of the disclosure.

In some embodiments, the first pig bar 708a and the second pig bar 708b may form a plurality of openings (720, 721, 722) in the pig bar assembly 708. In a non-limiting example, the pig bar assembly 708 may have an upper opening 720, a middle opening 721, and a lower opening 722. The upper opening 720 and the lower opening 722 may be equal in size and shape. Further, the middle opening 721 may be larger than the upper opening 720 and the lower opening 722. Additionally, the first pig bar 708a and the second pig bar 708b may be positioned in the pig bar assembly 708 such that an end of the plurality of vanes 707 are colinear with the first pig bar 708a and the second pig bar 708b. The pig bars 708a, 708b may be attached to the ends of the vanes 707 or integrally formed with the vanes 707, e.g., using a 3D printing process to form the insert.

In accordance with one or more embodiments, the guide vane insert 700 may be forged, machined, formed by additive manufacturing from a material selected from metal materials, plastic materials, carbon fiber materials, composite materials, ceramics, or structural insulating materials. In a non-limiting example, the guide vane insert 700 may be the same material as the valve block. Additionally, the guide vane insert 700 may be coated in an anti-corrosion material. It is further envisioned that the guide vane insert 700 may be made out of any material and then coated with an erosion resistant layer of materials such as tungsten carbide. In some embodiments, the guide vane insert 700 may be machined, forged, or formed by additive manufacturing as one integrated piece or may have the plurality of vanes 707 and/or the pig bar assembly 708 removably attached thereto.

Furthermore, methods of the present disclosure may include manufacturing the guide vane insert (e.g., 200, 700), valve block, and other structures, such as in FIGS. 1-7B for creating a steadier and uniform flow. Because the following method may apply to any of the embodiments disclosed herein, reference numbers are not referenced to avoid confusion of the numbering between the different embodiments.

In one or more embodiments, a valve block may be machined or forged from one solid piece of material. Those skilled in the art would appreciate how the material can be any material suitable for well site conditions, for example, metals, ceramics, and/or composites. Additionally, coatings may be added to the valve block for thermal insulation and to prevent corrosion. The valve block may be forged and/or machined into the size and shape needed based on a required application. Further, the valve block may be forged and/or machined to integrate at least two intersecting flow bores in a body of the valve block, where manufacturing processes well known in the art may be used to ensure proper dimensions and cleanliness of the bores are achieved. In a non-limiting example, the body of the valve block may be forged and/or machined without any flow bores, and then the body may be drilled to have a first flow bore intersecting a second flow bore to form a cross-drill intersection bore at the intersection. Further, the cross-drill intersection bore may be further machined to have curved profile. In some embodiments, a groove may be cut into a portion of the first flow bore or the second flow bore.

Additionally, a guide vane insert may be manufactured from a process of machining, forging, additive manufacturing or other methods from one solid piece of material or multiple components. In a non-limiting example, the guide vane insert may be forged, machined, made from additive manufacturing, and/or other methods to have an outer wall and a passageway defined through the outer wall such that an inner surface is defined is opposite the outer wall. Additionally, the passageway may have openings at opposite ends of the guide vane insert. Further, a plurality of vanes may be forged, machined, made from additive manufacturing, and/or other methods to extend from an inner surface of the outer wall. In some embodiments, the plurality of vanes may extend a full height of the passageway and may be equally spaced in a radial direction. Furthermore, a pig bar may be positioned perpendicular to the plurality of vanes at an end of the guide vane insert, or in some embodiments, a pig bar may be positioned non-perpendicularly to the plurality of vanes, such as colinear with an end of the plurality of vanes. The vanes and/or pig bar may be integrally formed with the insert wall, or in some embodiments, the vanes and/or pig bar may be attached within a pre-formed insert wall.

With the flow bores and the cross-drill intersection bore formed, the guide vane insert may be positioned within one of the flow bores and be held in the groove, such as by welding the insert to the groove. The guide vane insert may be welded or integrally formed such that the guide vane insert is fixed in the first flow bore or the second flow bore. It is further envisioned that the guide vane insert may also be removably attached to a flow bore via, without limitation, mechanical fasteners, adhesives, and other known methods or combination thereof. In particular, the outer wall of the guide vane insert may be connected to an inner surface of a flow bore. Additionally, the guide vane insert may be positioned in a flow bore such that an end of the guide vane insert is aligned with a surface of the cross-drill intersection bore. Additionally, said end of the guide vane insert may be machined to have a curve align with a curvature of the surface of the cross-drill intersection bore. It is further envisioned that an edge of the pig bar of the guide vane insert may also be aligned with the surface of the cross-drill intersection bore. In some embodiments, a pig bar and/or vanes in an insert may be inset from an end surface of the insert, and the end surface of the insert may be aligned with the surface of the cross-drill intersection bore, such that a length of the insert wall measured from the end surface of the insert does not have a pig bar and/or vanes extending therefrom.

Further, one skilled in the art will appreciate how the flow bores, the cross-drill intersection bore, and the guide vane insert may be cladded with a corrosion resistant alloy during or after the installation of the guide vane insert in the valve block. Corrosion resistant alloys may be formed of, for example, martensitic and martensitic/ferritic stainless steel, duplex stainless steel, austenitic-nickel-base alloys, and others, depending on, for example, the environment in which the CRA is to be used.

According to embodiments of the present disclosure, a block of metal or alloy used to form a manifold may be heat treated. After heat treatment, the block may be pre-machined to form one or more flow bores through the block. Portions of the pre-machined block (e.g., the inner surfaces of the flow bores) may then optionally be cladded, for example, with a material for added erosion resistance. An insert according to embodiments of the present disclosure may be welded within one or more of the flow bores either before or during the cladding. Thus, according to embodiments of the present disclosure, an insert may be pre-made prior to attaching within a flow bore. A second machining step may be performed after cladding to assure critical dimensions are maintained.

In addition to the benefits described above, with the guide vane insert reducing the effects of erosion from fluids by deflecting particles away from sensitive areas (and may also act as sacrificial elements), the valve block may have more sensitive components installed thereof and may include components near regions within the valve block subjected to high velocity flow. Further, the guide vane insert may beneficially enable a compact and lighter weight valve block that may reduce overall cost and complexity of the design. A lighter more compact valve block may increase the range of valve block types being capable of installing to corresponding well equipment, thereby reducing the reliance on a limited number of multi service valve blocks. It is noted that the guide vane insert may be used for onshore and offshore oil and gas operations.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A valve block, comprising:
   a cross-drill intersection bore formed within the valve block by a first flow bore intersecting a second flow bore; and
   at least one insert within the first flow bore or the second flow bore, the at least one insert comprising:
   a wall contacting an inner surface of the first flow bore or the second flow bore;
   a passageway defined within the wall and having openings at opposite ends of the insert; and
   a plurality of vanes extending from an inner surface of the wall into the passageway,
   wherein one of the opposite ends of the at least one insert aligns with a surface of the cross-drill intersection bore.

2. The valve block of claim 1, wherein the at least one insert is within a groove of the first flow bore or the second flow bore.

3. The valve block of claim 1, wherein a thickness of the wall, measured from an outer surface of the wall to the inner surface of the wall, reduces an inner diameter of the first flow bore or the second flow bore.

4. The valve block of claim 1, wherein the plurality of vanes are parallel with each other and each extend between opposite sides of the inner surface of the wall.

5. The valve block of claim 1, wherein the plurality of vanes are twisted along a length of the insert.

6. The valve block of claim 1, further comprising at least one pig bar extending between opposite sides of the inner surface of the wall proximate the cross-drill intersection bore in one of the passageway openings.

7. The valve block of claim 6, wherein the at least one pig bar extends in a direction perpendicular to the plurality of vanes.

8. The valve block of claim 6, wherein the at least one pig bar extends in a colinear direction with a first end of the plurality of vanes.

\* \* \* \* \*